US 8,145,937 B2

(12) United States Patent
Yoo

(10) Patent No.: US 8,145,937 B2
(45) Date of Patent: Mar. 27, 2012

(54) SYSTEM AND METHOD FOR COMMUNICATION ERROR PROCESSING IN OUTSIDE CHANNEL COMBINATION ENVIRONMENT

(75) Inventor: Kap Sik Yoo, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 15 days.

(21) Appl. No.: 12/444,827

(22) PCT Filed: Dec. 8, 2006

(86) PCT No.: PCT/KR2006/005326
§ 371 (c)(1),
(2), (4) Date: Sep. 16, 2009

(87) PCT Pub. No.: WO2008/044810
PCT Pub. Date: Apr. 17, 2008

(65) Prior Publication Data
US 2010/0122112 A1   May 13, 2010

(30) Foreign Application Priority Data
Oct. 11, 2006   (KR) .................. 10-2006-0099080

(51) Int. Cl.
*G06F 11/00* (2006.01)
(52) U.S. Cl. ........................................ 714/4.2
(58) Field of Classification Search .............. 714/4.2
See application file for complete search history.

(56) References Cited

U.S. PATENT DOCUMENTS

| 6,148,410 A | 11/2000 | Baskey et al. |
| 6,694,288 B2 | 2/2004 | Smocha et al. |
| 6,938,182 B2 * | 8/2005 | Shaffer et al. ............... 714/9 |
| 7,197,660 B1 * | 3/2007 | Liu et al. ...................... 714/4 |
| 7,363,528 B2 * | 4/2008 | Chan et al. ................... 714/4 |

(Continued)

FOREIGN PATENT DOCUMENTS

| EP | 1376361 A1 | 1/2004 |
| KR | 20000039571 A | 7/2000 |
| KR | 20040055771 A | 6/2004 |

*Primary Examiner* — Robert Beausoliel, Jr.
*Assistant Examiner* — Neil Miles
(74) *Attorney, Agent, or Firm* — The Webb Law Firm

(57) ABSTRACT

Provided are a system and method for processing communication errors in an outside channel combination environment. The system includes: first and second outside-affairs servers connected with a plurality of user terminals and having respective outside-affairs processing applications to perform outside affairs associated with a plurality of outside authorities; first and second outside channel combination servers for processing outside affairs associated with the outside authorities, the first and second outside channel combination servers having respective message relaying and communication applications to interwork with the first and second outside-affairs servers; first and second active and standby network devices respectively connected in parallel with the first and second outside channel combination servers, the first and second active network devices performing normal outside affairs, and the first and second standby network devices being activated when a communication error is generated to perform the normal outside affairs; and first and second switching devices respectively provided between the first and second active and standby network devices and the outside authorities to selectively connect the first and second active and standby network devices when the communication error is generated. Thus, communication errors can be minimized and system resources can be efficiently managed by distributing system loads.

16 Claims, 11 Drawing Sheets

U.S. PATENT DOCUMENTS

| | | | |
|---|---|---|---|
| 7,643,468 B1 * | 1/2010 | Arregoces et al. | 370/351 |
| 7,802,010 B1 * | 9/2010 | Oehrke | 709/238 |
| 2004/0076160 A1 * | 4/2004 | Phaltankar | 370/395.1 |
| 2004/0078711 A1 * | 4/2004 | King et al. | 714/43 |
| 2004/0100970 A1 | 5/2004 | Gerdisch et al. | |
| 2004/0196838 A1 * | 10/2004 | Zadikian et al. | 370/360 |
| 2005/0080887 A1 | 4/2005 | Lee et al. | |
| 2005/0165960 A1 * | 7/2005 | Orava et al. | 709/239 |
| 2005/0172161 A1 | 8/2005 | Cruz et al. | |
| 2006/0092950 A1 * | 5/2006 | Arregoces et al. | 370/396 |
| 2006/0224731 A1 | 10/2006 | Haga et al. | |
| 2007/0147279 A1 * | 6/2007 | Smith et al. | 370/316 |

* cited by examiner

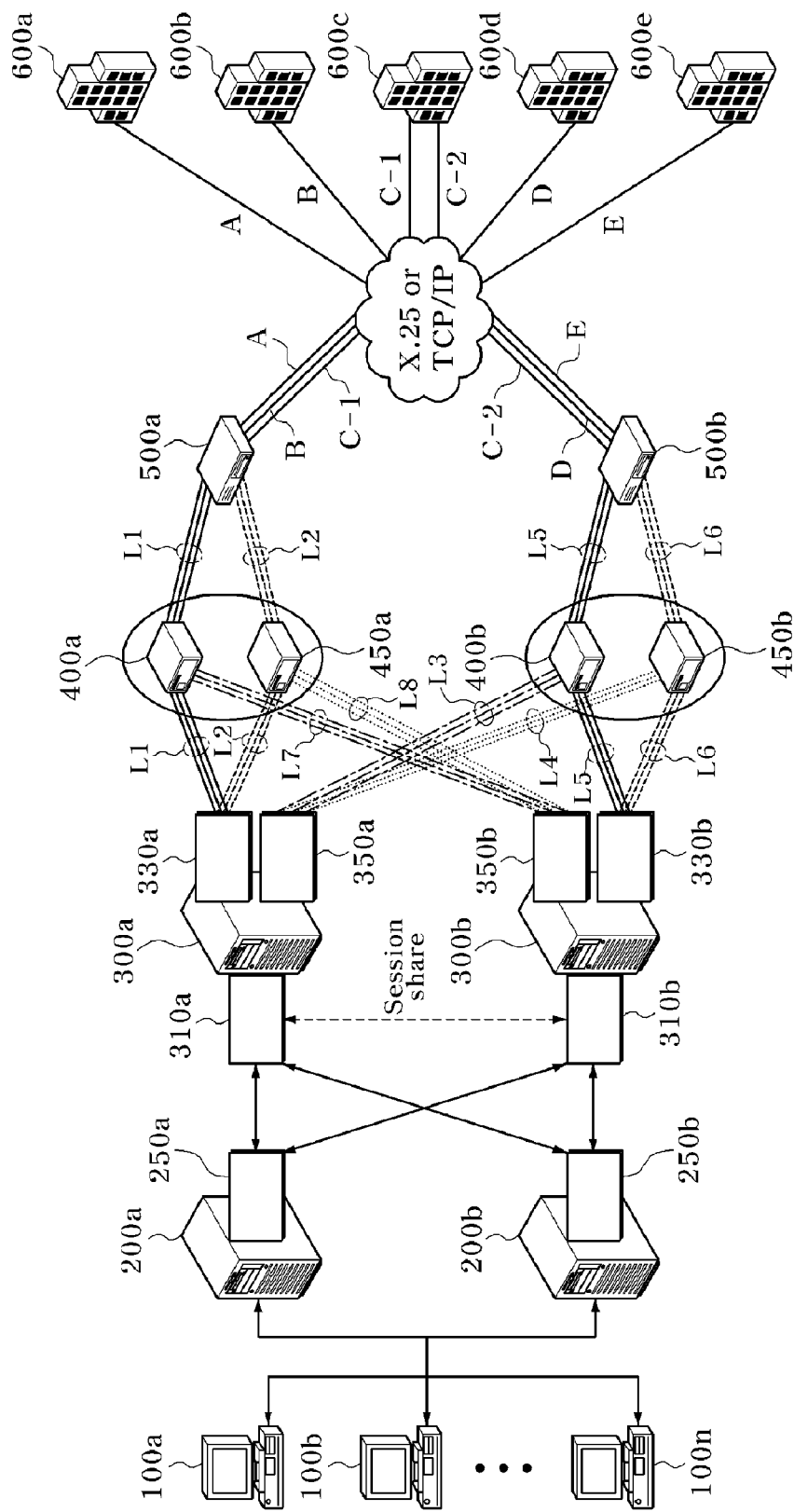
[Fig. 1]

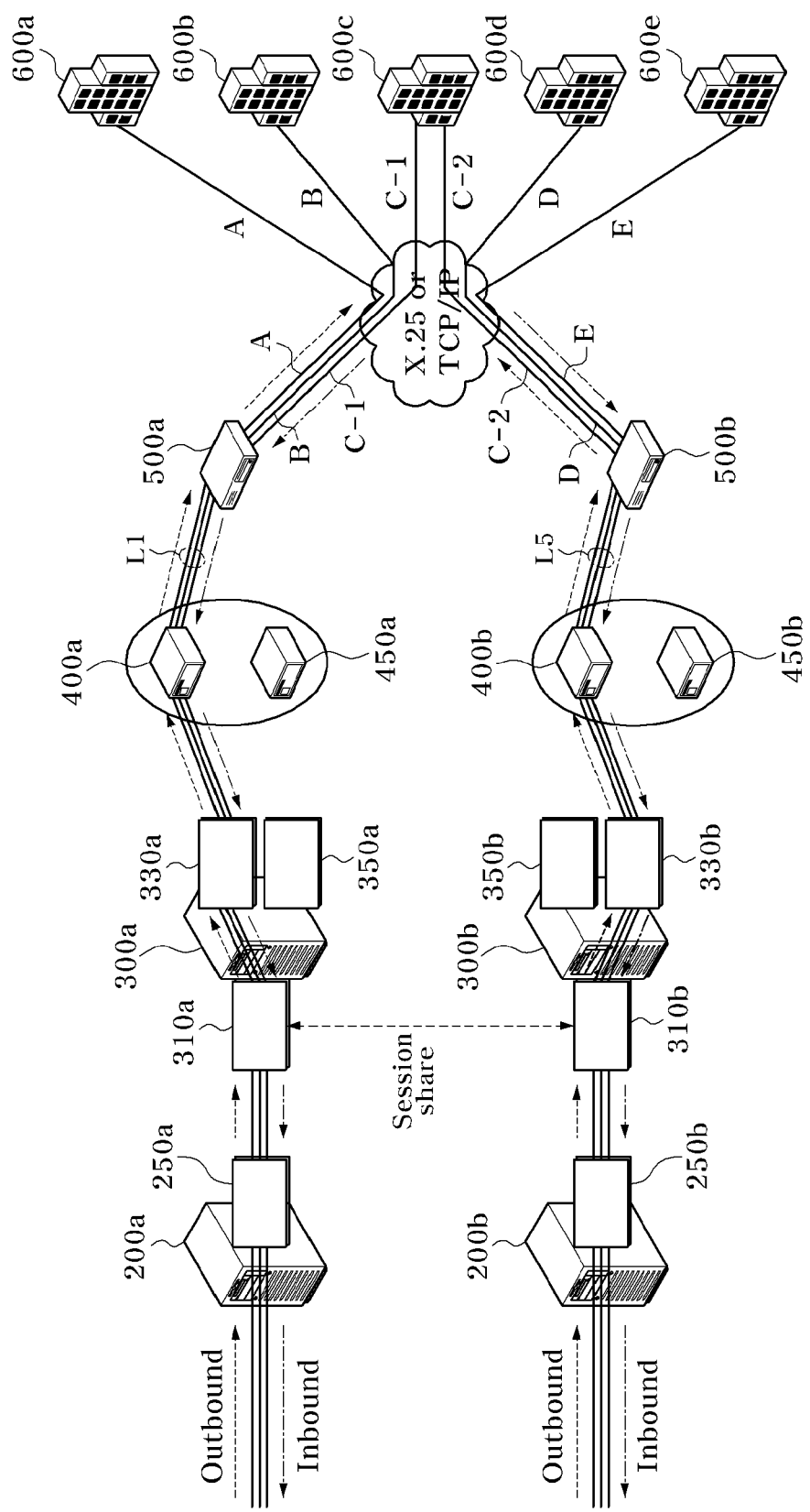
[Fig. 2]

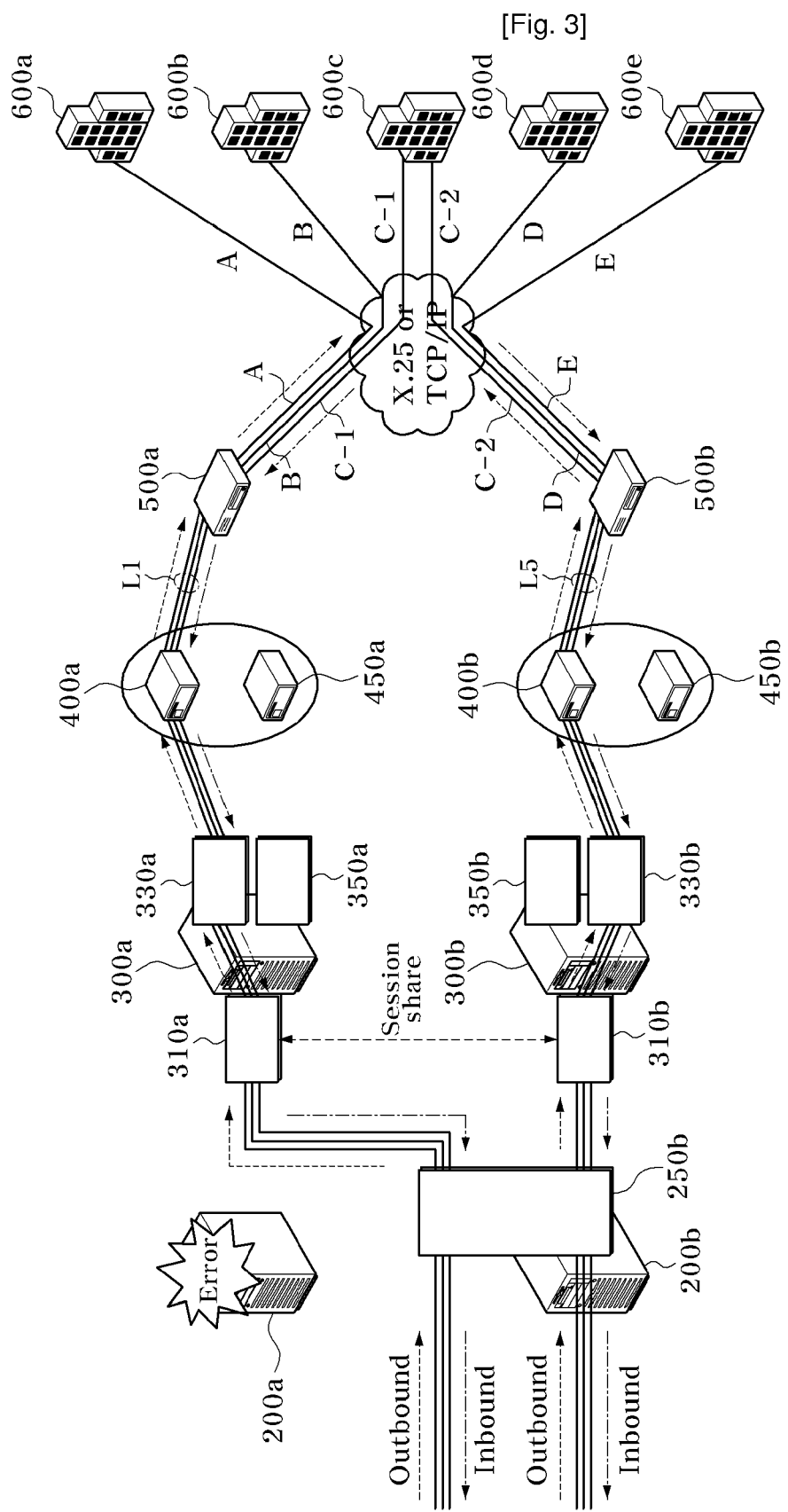
[Fig. 3]

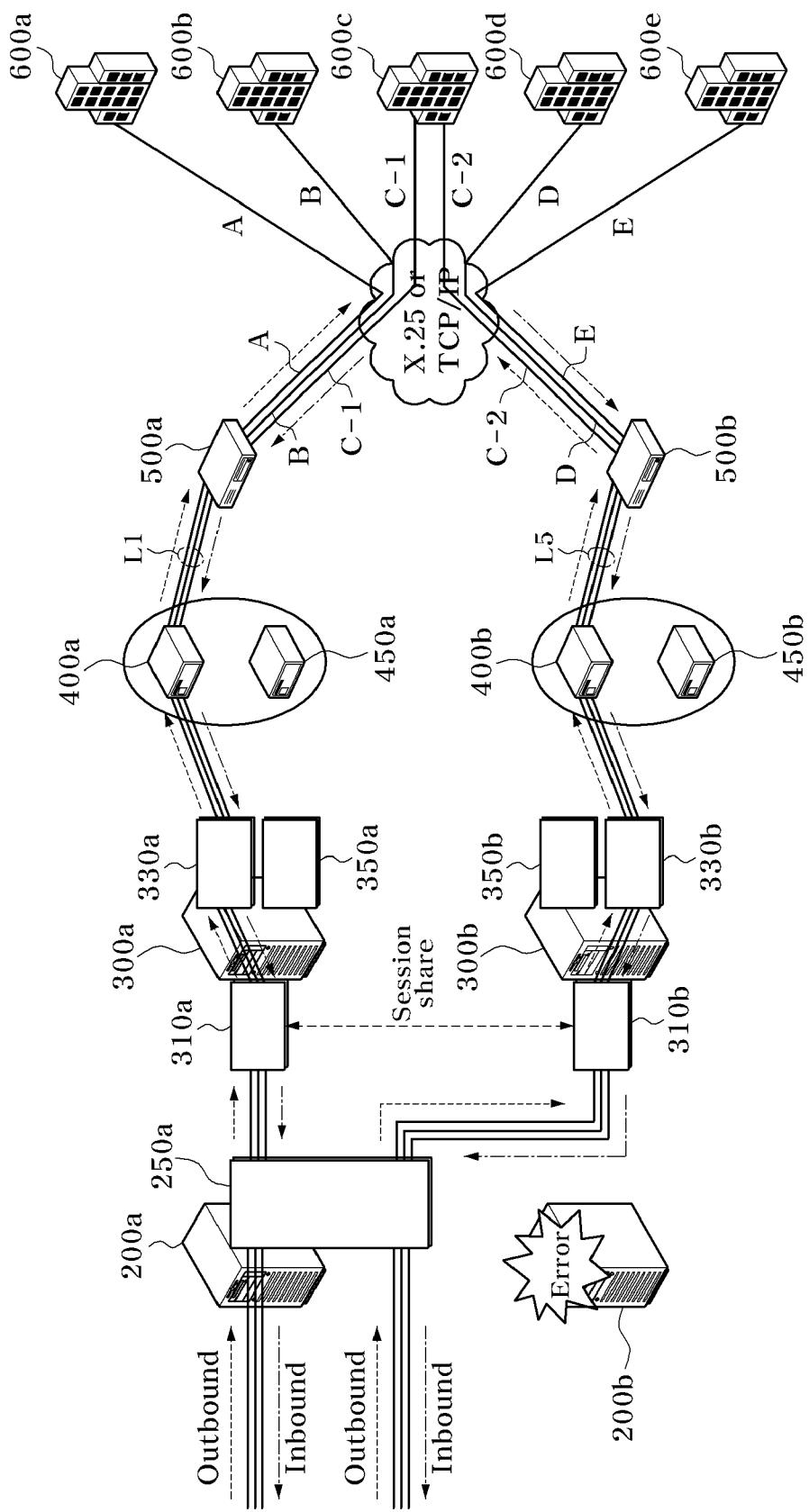
[Fig. 4]

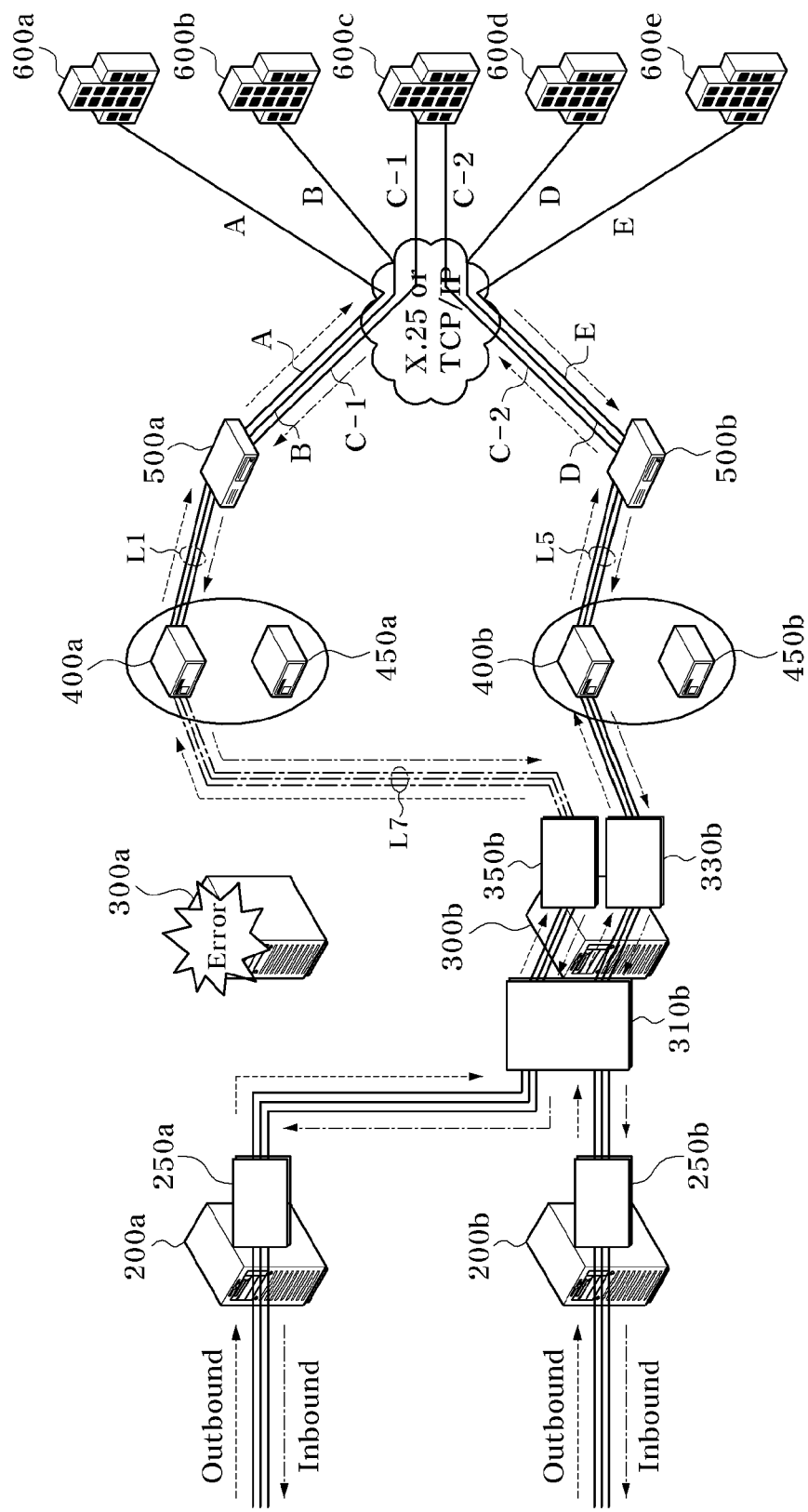
[Fig. 5]

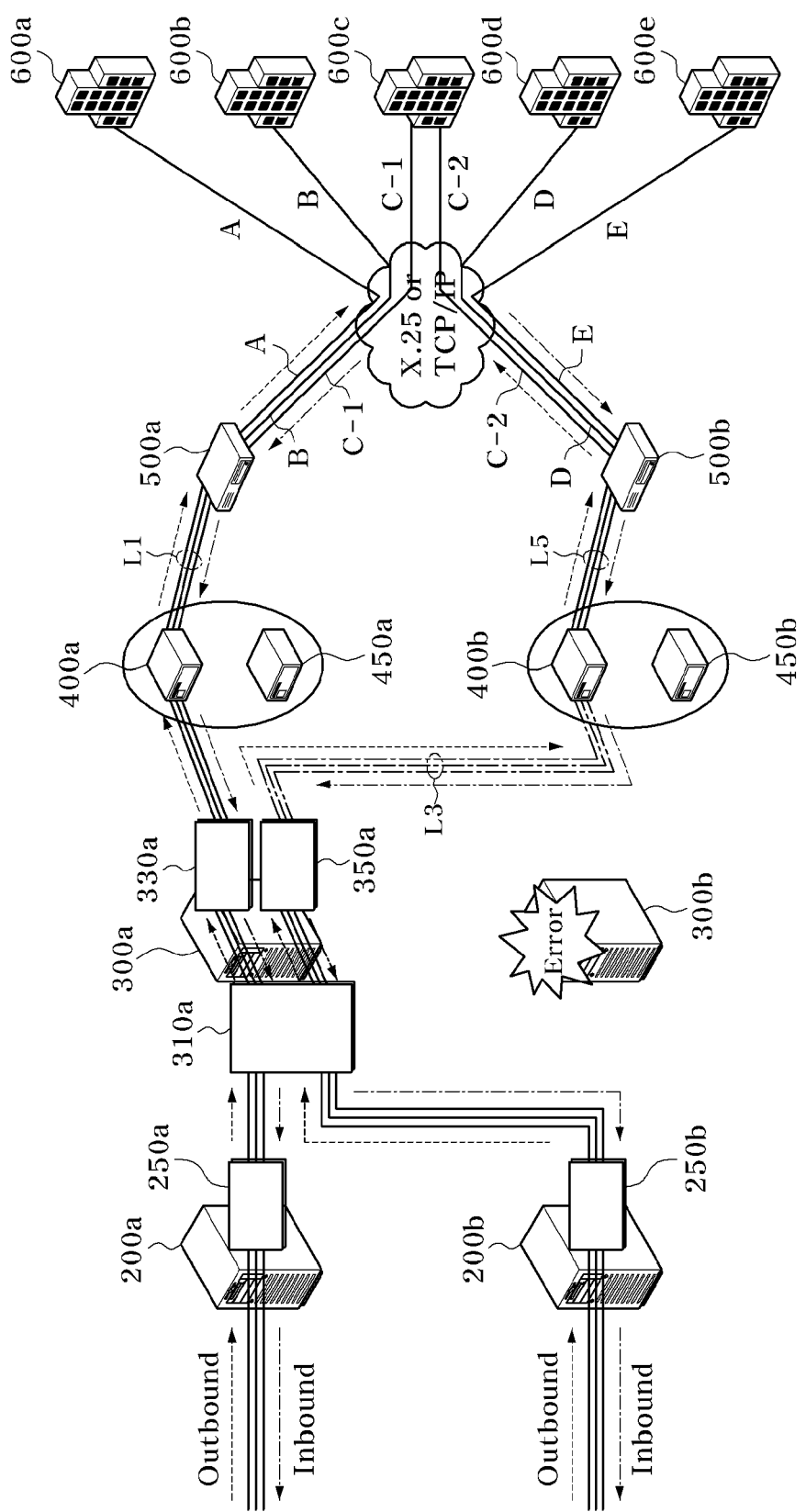
[Fig. 6]

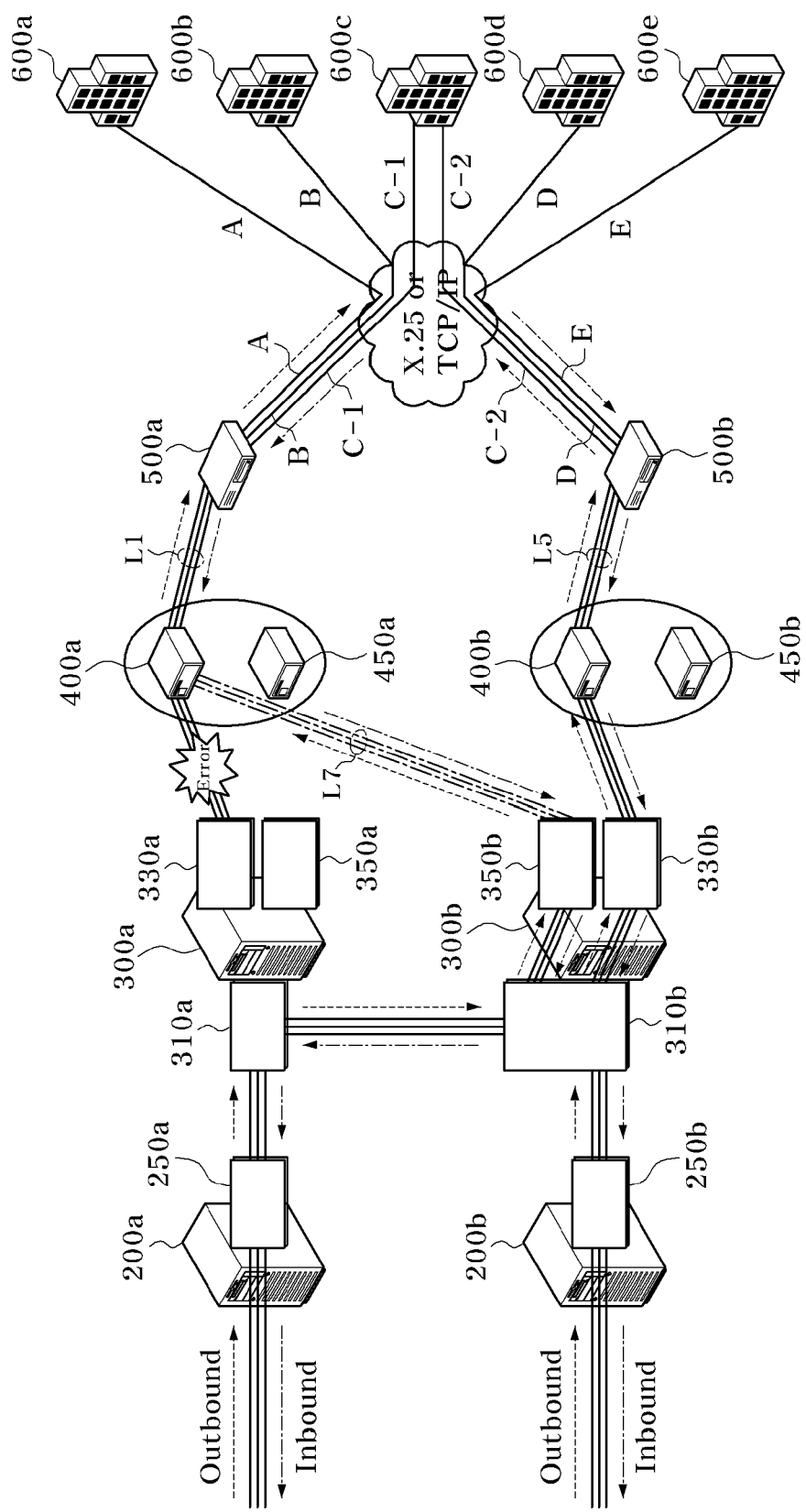
[Fig. 7]

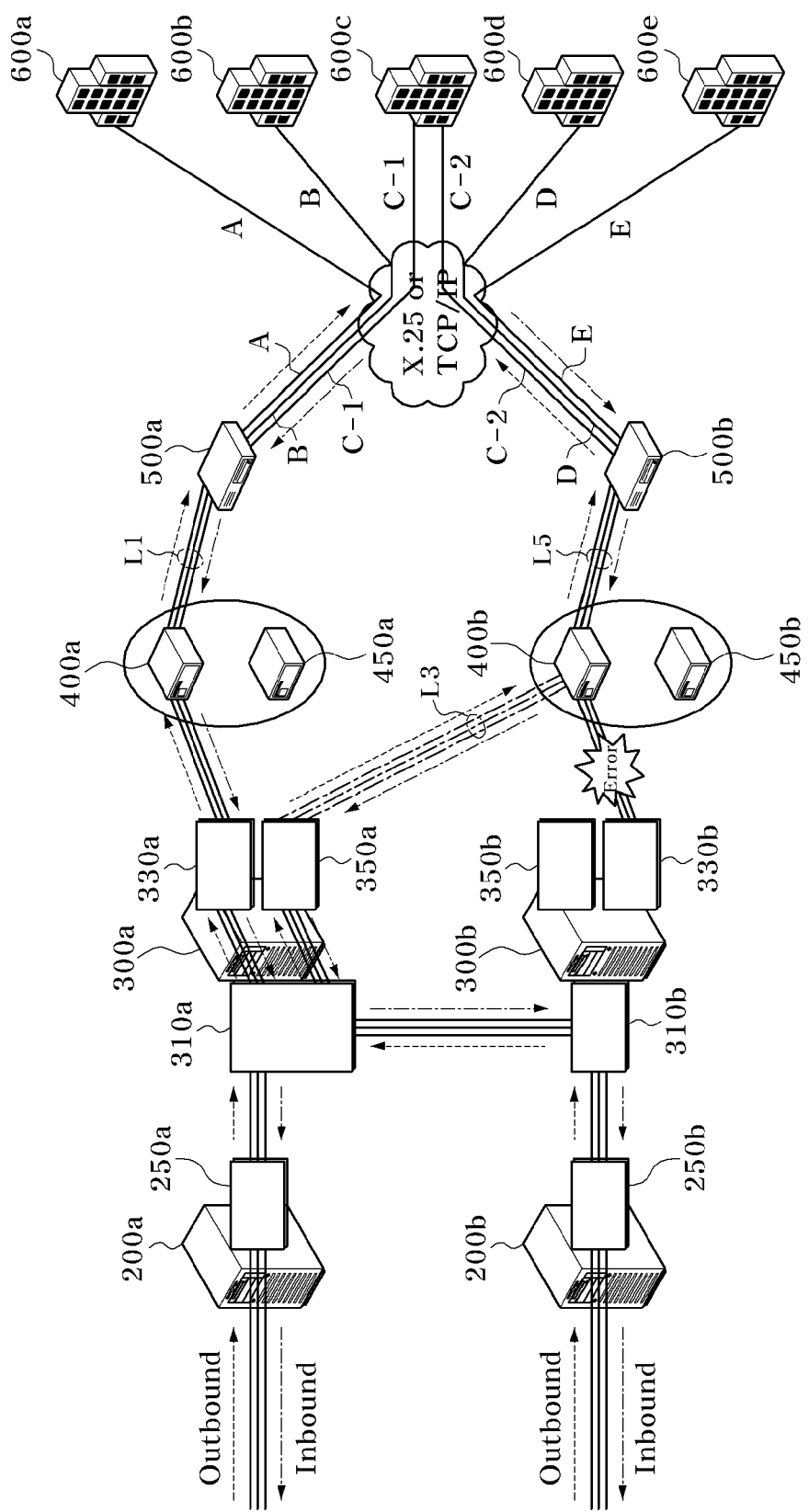
[Fig. 8]

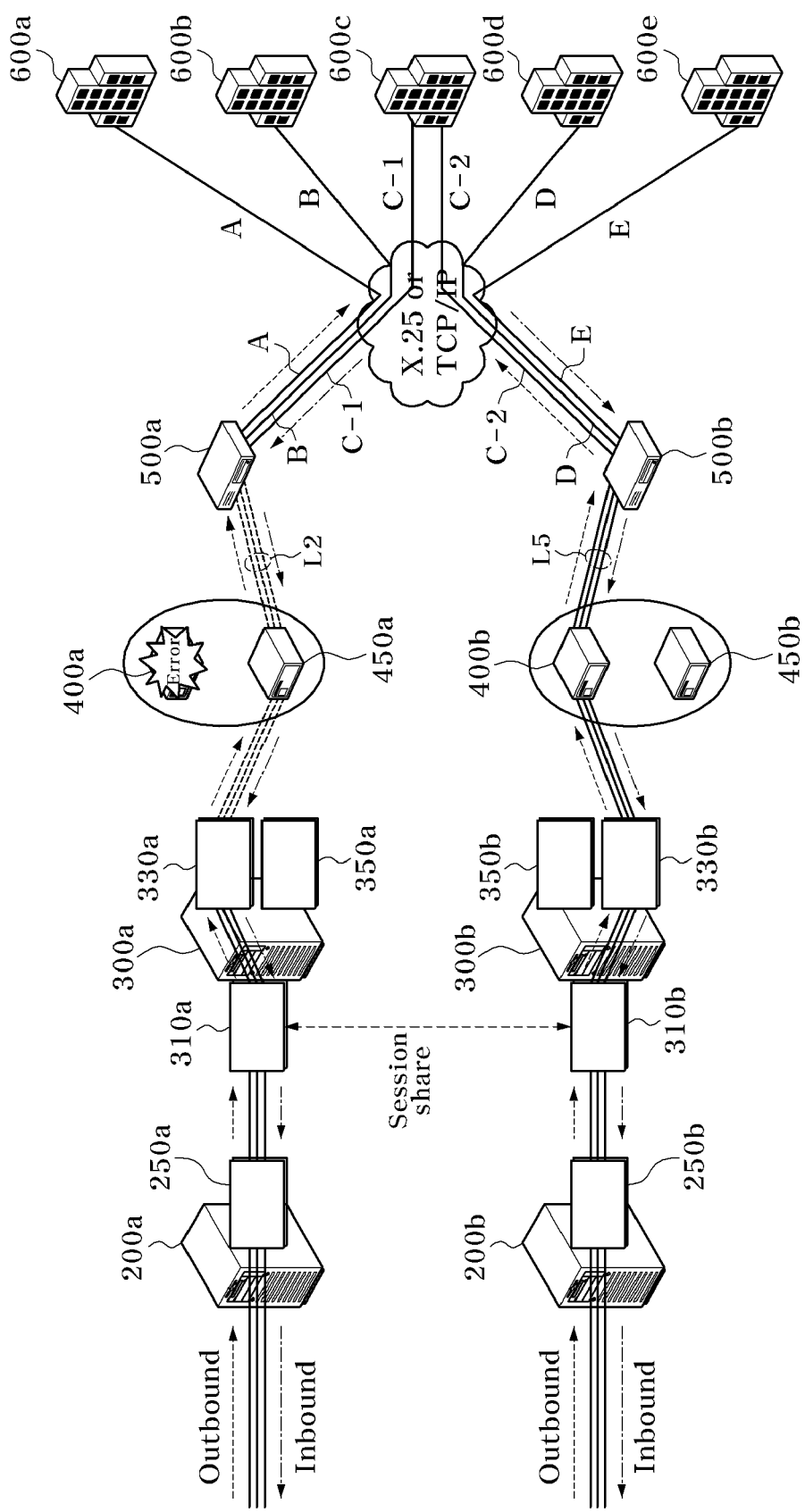
[Fig. 9]

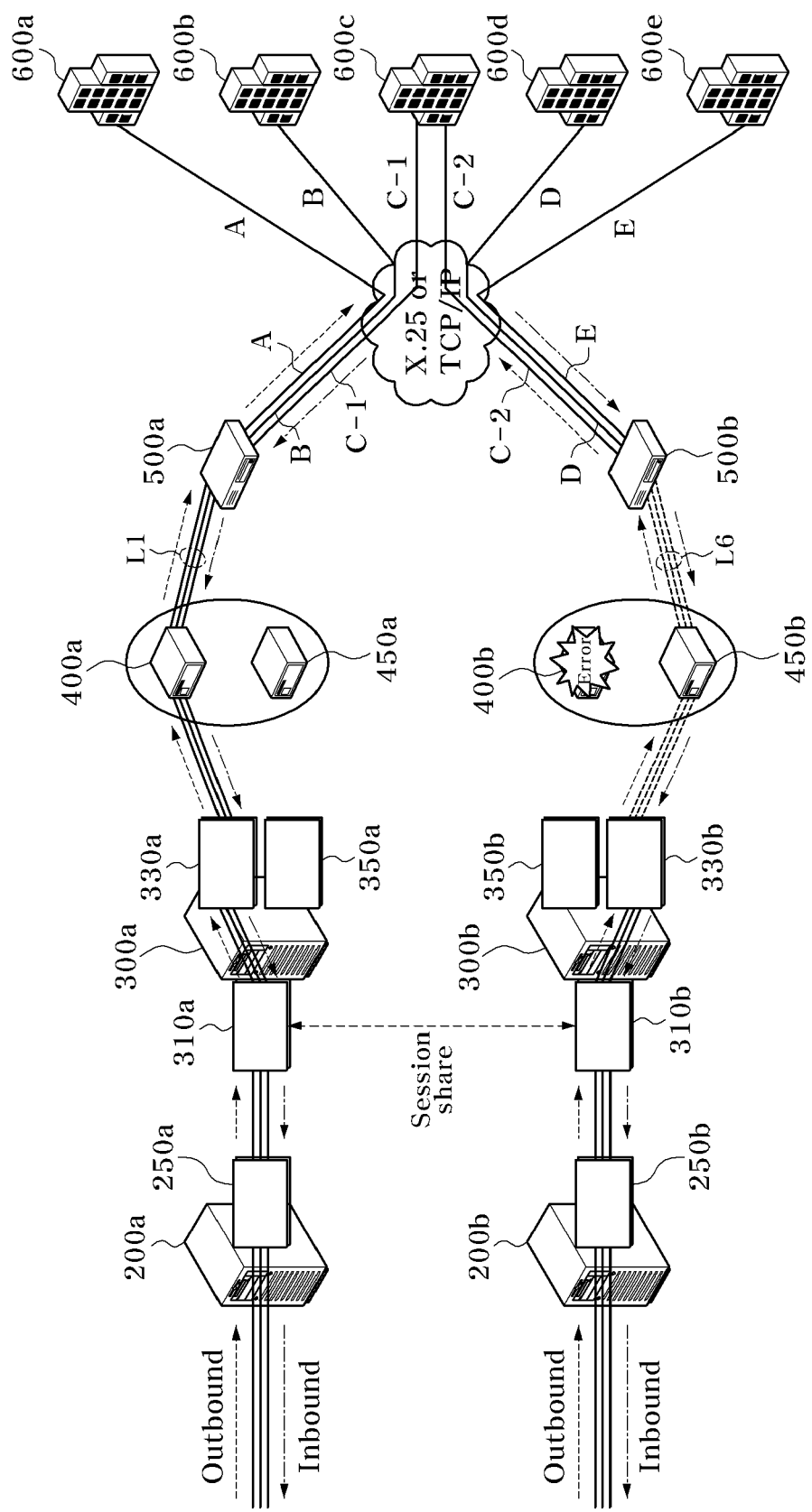
[Fig. 10]

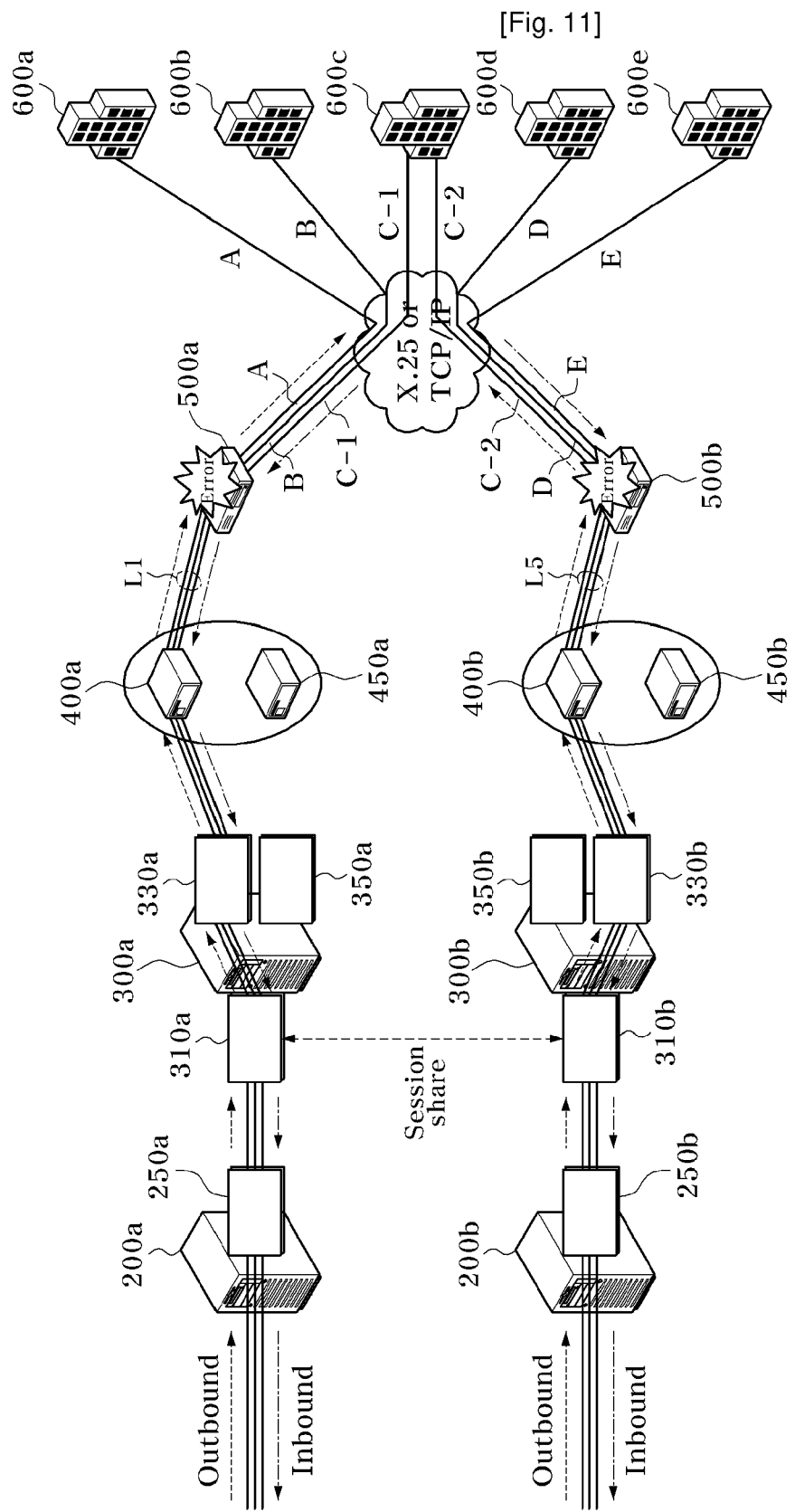
[Fig. 11]

SYSTEM AND METHOD FOR COMMUNICATION ERROR PROCESSING IN OUTSIDE CHANNEL COMBINATION ENVIRONMENT

TECHNICAL FIELD

The present invention relates to a system and method for processing communication errors in an outside channel combination environment.

BACKGROUND ART

In general, banking authorities share information with a plurality of outside authorities (e.g., financial supervisory authorities, credit rating agencies, credit card companies, commercial banks, and the like) for affairs processing. A message transmission line (e.g., an X.25 or a TCP/IP-based private line) is used to transmit and receive messages between affairs processing systems in the banking authorities and the outside authorities.

In order for a newly built system or a currently used system in a banking authority to perform affairs processing associated with a specific outside authority, the two authorities make an agreement on affairs and then share information required for actual affairs performance through defined messages.

Here, the message is information required for affairs processing between the two authorities, and is transmitted and received in a predefined form. For normal affairs processing, stable message transmission and reception is important.

A conventional technique is disclosed in Korean Patent Laid-open Publication No. 2000-0039571 entitled "A Multi Host Processing System and a Message Processing Method", in which hosts of banking authorities are multiplexed using an outside server for processing outside affairs associated with other banking authorities, and internal transactions are made in outside affairs transactions with other banking authorities.

In this conventional technique, however, a message transmission and reception between an affairs processing system in a banking authority and outside authorities is made impossible when a communication error is generated in a server of the system or when lines fail.

DISCLOSURE OF INVENTION

Technical Problem

The present invention is directed to a system and method for processing communication errors in an outside channel combination environment, capable of minimizing communication errors and efficiently managing system resources by distributing system loads.

The present invention is also directed to a system and method for processing communication errors in an outside channel combination environment, capable of stabilizing message transmission and reception so that affairs processing between an internal affairs processing system and an outside authority is performed smoothly without interruption.

Technical Solution

One aspect of the present invention provides a system for processing communication errors in an outside channel combination environment, comprising: first and second outside-affairs servers connected with a plurality of user terminals and having respective outside-affairs processing applications to perform outside affairs associated with a plurality of outside authorities; first and second outside channel combination servers for processing outside affairs associated with the outside authorities, the first and second outside channel combination servers having respective message relaying and communication applications to interwork with the first and second outside-affairs servers; first and second active and standby network devices respectively connected in parallel with the first and second outside channel combination servers, the first and second active network devices performing normal outside affairs, and the first and second standby network devices being activated when a communication error is generated to perform the normal outside affairs; and first and second switching devices respectively provided between the first and second active and standby network devices and the outside authorities to selectively connect the first and second active and standby network devices when the communication error is generated.

When an outbound message is transmitted to the message relaying applications of the first and second outside channel combination servers via the outside-affairs processing applications of the first and second outside-affairs servers, loads may be balanced in a ratio of 50:50.

When an inbound message is transmitted to the outside-affairs processing applications of the first and second outside channel combination servers via the message relaying applications of the first and second outside-affairs servers, loads may be balanced in a ratio of 50:50.

The message relaying applications of the first and second outside channel combination servers may share information related to message processing via a session, and function to manage line connection information required for message transmission and a transmission state.

The communication application of the first outside channel combination server may comprise: a first master communication application connected with the first active and standby network devices via active and backup lines to transmit and receive messages between the first outside-affairs server and the first active or standby network device according to whether or not a communication error is generated in the first active and standby network devices; and a first backup communication application connected with the second active and standby network devices via backup lines to transmit and receive messages between the second outside-affairs server and the second active or standby network device according to whether or not a communication error is generated in the second active and standby network devices when a communication error is generated in the second outside channel combination server. The communication application of the second outside channel combination server may comprise: a second master communication application connected with the second active and standby network devices via the active and backup lines to transmit and receive the messages between the second outside-affairs server and the second active or standby network device according to whether or not the communication error is generated in the second active and standby network device; and a second backup communication application connected with the first active and standby network devices via the backup lines to transmit and receive the messages between the first outside-affairs server and the first active or standby network device according to whether or not the communication error is generated in the first active and standby network devices when the communication error is generated in the first outside channel combination server.

When the communication error is generated in the first outside channel combination server, the first active network device may automatically switch from the active lines connected with the first outside channel combination server to the backup lines connected with the second backup communication application of the second outside channel combination server, and allow messages between the first outside-affairs server and the outside authorities to be transferred via a path composed of the second backup communication application, the first active network device, and the first switching device. When the communication error is generated in the second outside channel combination server, the second active network device may automatically switch from the active lines connected with the second outside channel combination server to the backup lines connected with the first backup communication application of the first outside channel combination server, and allow messages between the second outside-affairs server and the outside authorities to be transferred via a path composed of the first backup communication application, the second active network device, and the second switching device.

When the active lines connected between the first outside channel combination server and the first active network device fail, the first active network device may automatically switch from the active lines connected with the first outside channel combination server to the backup lines connected with the second backup communication application of the second outside channel combination server, and allow messages between the first outside-affairs server and the outside authorities to be transferred via a path composed of the message relaying applications of the first and second outside channel combination servers, the second backup communication application, the first active network device, and the first switching device. When the active lines connected between the second outside channel combination server and the second active network device fail, the second active network device may automatically switch from the active lines connected with the second outside channel combination server to the backup lines connected with the first backup communication application of the first outside channel combination server, and allow messages between the second outside-affairs server and the outside authorities to be transferred via a path composed of the message relaying applications of the second and first outside channel combination servers, the first backup communication application, the second active network device, and the second switching device.

The first switching device may be connected with the first active and standby network devices via the active and backup lines and automatically switch to the first standby network device when the communication error is generated in the first active network device, and the second switching device may be connected with the second active and standby network devices via the active and backup lines and automatically switch to the second standby network device when the communication error is generated in the second active network device.

In normal operation of the system, the messages may be transferred to and from the outside authorities via the path composed of the first outside-affairs server, the first outside channel combination server, the first active network device, and the first switching device, and the messages may be transferred to and from the outside authorities via the path composed of the second outside-affairs server, the second outside channel combination server, the second active network device, and the second switching device.

When the communication error is generated in the first outside-affairs server, the second outside-affairs server may process all outside affairs including outside affairs that have been processed by the first outside-affairs server, and allow the messages to be transferred to and from the outside authorities via the path composed of the second outside-affairs server, the first outside channel combination server, the first active network device, and the first switching device. When the communication error is generated in the second outside-affairs server, the first outside-affairs server may process all outside affairs including outside affairs that have been processed by the second outside-affairs server, and allow the messages to be transferred to and from the outside authorities via the path composed of the first outside-affairs server, the second outside channel combination server, the second active network device, and the second switching device.

When the communication error is generated in the first active network device, or when the active lines connected between the first active network device and the first switching device fail, the messages may be transferred to and from the outside authorities via the path composed of the first outside-affairs server, the first outside channel combination server, the first standby network device, and the first switching device. When the communication error is generated in the second active network device, or when the active lines connected between the second active network device and the second switching device fail, the messages may be transferred to and from the outside authorities via the path composed of the second outside-affairs server, the second outside channel combination server, the second standby network device, and the second switching device.

Another aspect of the present invention provides a method for processing communication errors in an outside channel combination system environment comprising first and second outside-affairs servers, first and second outside channel combination servers, first and second active and standby network devices, and first and second switching devices, the method comprising the steps of: (a) in normal operation of the system, transferring messages to and from a plurality of outside authorities via a path composed of the first outside-affairs server, the first outside channel combination server, the first active network device, and the first switching device; (b) in normal operation of the system, transferring messages to and from the outside authorities via a path composed of the second outside-affairs server, the second outside channel combination server, the second active network device, and the second switching device; (c) when a communication error is generated in the first outside-affairs server, processing, by the second outside-affairs server, all outside affairs including outside affairs that have been processed by the first outside-affairs server, and transferring the messages to and from the outside authorities via the path composed of the second outside-affairs server, the first outside channel combination server, the first active network device, and the first switching device; and (d) when a communication error is generated in the second outside-affairs server, processing, by the first outside-affairs server, all outside affairs including outside affairs that have been processed by the second outside-affairs server, and transferring the messages to and from the outside authorities via the path composed of the first outside-affairs server, the second outside channel combination server, the second active network device, and the second switching device.

The method may further comprise the steps of: (e) when a communication error is generated in the first active network device, or when active lines connected between the first active network device and the first switching device fail, transferring the messages to and from the outside authorities via the path composed of the first outside-affairs server, the first outside channel combination server, the first standby network device, and the first switching device; and (f) when a communication error is generated in the second active network device, or when active lines connected between the second active network device and the second switching device fail, transferring the messages to and from the outside authorities via the path composed of the second outside-affairs server, the second outside channel combination server, the second standby network device, and the second switching device.

The method may further comprise the steps of: (g) when the communication error is generated in the first outside channel combination server, automatically switching, by the first active network device, from the active lines connected with the first outside channel combination server to backup lines connected with the second backup communication application of the second outside channel combination server, and transferring messages between the first outside-affairs server and the outside authorities via the path composed of the second outside channel combination server, the first active network device, and the first switching device; and (h) when the communication error is generated in the second outside channel combination server, automatically switching, by the second active network device, from the active lines connected with the second outside channel combination server to the backup lines connected with the first backup communication application of the first outside channel combination server, and transferring messages between the second outside-affairs server and the outside authorities via the path composed of the first outside channel combination server, the second active network device, and the second switching device.

The method may further comprise the steps of: (i) when the active lines connected between the first outside channel combination server and the first active network device fail, automatically switching, by the first active network device, from the active lines connected with the first outside channel combination server to the backup lines connected with the second backup communication application of the second outside channel combination server, and transferring messages between the first outside-affairs server and the outside authorities via a path composed of message relaying applications of the first and second outside channel combination servers, a backup communication application of the second outside channel combination server, the first active network device, and the first switching device; and (j) when the active lines connected between the second outside channel combination server and the second active network device fail, automatically switching, by the second active network device, from the active lines connected with the second outside channel combination server to the backup lines connected with the first backup communication application of the first outside channel combination server, and transferring messages between the second outside-affairs server and the outside authorities via a path composed of message relaying applications of the first and second outside channel combination servers, a backup communication application of the first outside channel combination server, the second active network device, and the second switching device.

Still another aspect of the present invention provides a computer-readable recording medium having a program recorded thereon for implementing the method for processing communication errors in an outside channel combination system environment.

Advantageous Effects

As described above, according to the present invention, the system comprises the outside-affairs server and outside channel combination server in an active-active form, and the active and standby network devices in an active-standby form, thereby minimizing communication errors and efficiently managing system resources by distributing system loads.

In addition, the outbound/inbound message transmission and reception is stabilized, so that affairs processing between the internal affairs processing system and the outside authorities is performed smoothly without interruption.

BRIEF DESCRIPTION OF THE DRAWINGS

FIG. 1 is a schematic block diagram of a system for processing communication errors in an outside channel combination environment according to an exemplary embodiment of the present invention; and FIGS. 2 to 11 are flow diagrams illustrating message processing dependent on communication errors in a system for processing communication errors in an outside channel combination environment according to an exemplary embodiment of the present invention.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

FIG. 1 is a schematic block diagram of a system for processing communication errors in an outside channel combination environment according to an exemplary embodiment of the present invention.

Referring to FIG. 1, the system for processing communication errors in an outside channel combination environment according to an exemplary embodiment of the present invention includes a plurality of user terminals $100a$ to $100n$, first and second outside-affairs servers $200a$ and $200b$, first and second outside channel combination servers $300a$ and $300b$, first active and standby network devices $400a$ and $450a$, second active and standby network devices $400b$ and $450b$, first and second switching devices $500a$ and $500b$, and a plurality of outside authorities $600a$ to $600e$.

The first and second outside-affairs servers $200a$ and $200b$ configured in an active-active form are connected to the user terminals $100a$ to $100n$ via, for example, a local area network (LAN).

The first and second outside-affairs servers $200a$ and $200b$ respectively include first and second outside-affairs processing applications (APs) $250a$ and $250b$ having the same function in order to perform outside affairs (e.g., bank deposit/payment, credit cards, insurance, securities, and other banking transaction affairs) associated with the outside authorities $600a$ to $600e$ (e.g., financial supervisory authorities, credit rating agencies, credit card companies, commercial banks, and the like).

Preferably, the first and second outside-affairs processing applications $250a$ and $250b$ of the first and second outside-affairs servers $200a$ and $200b$ perform load-balancing processing in a ratio of 50:50 when transmitting outbound messages through the first and second message relaying applications $310a$ and $310b$ of the first and second outside channel combination servers $300a$ and $300b$.

The first and second outside channel combination servers $300a$ and $300b$ configured in the active-active form are connected with the first and second outside-affairs servers $200a$ and $200b$ to interwork with the same, and function to process the outside affairs associated with the outside authorities $600a$ to $600e$.

The first and second outside channel combination servers 300a and 300b include first and second message relaying applications 310a and 310b for relaying a transmit/receive message, i.e., an outbound/inbound message, first and second master communication applications 330a and 330b, and first and second backup communication applications 350a and 350b, respectively.

Preferably, the first and second message relaying applications 310a and 310b of the first and second outside channel combination servers 300a and 300b perform load-balancing processing in a ratio of 50:50 when transmitting inbound messages to the first and second outside-affairs processing applications 250a and 250b of the first and second outside-affairs servers 200a and 200b.

In the first and second outside channel combination servers 300a and 300b, the first and second message relaying applications 310a and 310b share information related to message processing via a session, and function to manage line connection information required for message transmission, and a transmission state.

The first master communication application 330a is connected with the first active and standby network devices 400a and 450a in an active-standby form via active lines L1 and backup lines L2, and functions to transmit and receive an outbound/inbound message between the first outside-affairs server 200a and the first active or standby network device 400a or 450a according to whether or not a communication error is generated in the first active and standby network devices 400a and 450a.

The first backup communication application 350a is connected with the second active and standby network devices 400b and 450b in an active-standby form via backup lines L3 and L4, and functions to transmit and receive an outbound/inbound message between the second outside-affairs server 200b and the second active or standby network device 400b or 450b according to whether or not a communication error is generated in the second active and standby network devices 400b and 450b when a communication error is generated in the second outside channel combination server 300b.

The second master communication application 330b is connected with the second active and standby network devices 400b and 450b via active lines L5 and backup lines L6, and functions to transmit and receive an outbound/inbound message between the second outside-affairs server 250b and the second active or standby network device 400b or 450b according to whether or not a communication error is generated in the second active and standby network devices 400b and 450b.

The second backup communication application 350b is connected with the first active and standby network devices 400a and 450a via backup lines L7 and L8, and functions to transmit and receive an outbound/inbound message between the first outside-affairs server 200a and the first active or standby network device 400a or 450a according to whether or not a communication error is generated in the first active and standby network devices 400a and 450a when a communication error is generated in the first outside channel combination server 300a.

Meanwhile, the first outside channel combination server 300a configured as described above detects, in real time, the second active network device 400b automatically switching to the backup lines L3 connected with the first backup communication application 350a and automatically executes the first backup communication application 350a for the second master communication application 330b. The first backup communication application 350a re-establishes a private line (e.g., X.25 PVC) connection required for outbound/inbound message transmission and reception to and from the outside authorities 600a to 600e to automatically re-obtain the outbound/inbound message transmission line following the communication error.

Similarly, the second outside channel combination server 300b detects, in real time, the first active network device 400a automatically switching to the backup lines L7 connected with the second backup communication application 350b and automatically executes the second backup communication application 350b for the first master communication application 330a. The second backup communication application 350b reestablishes a private line (e.g., X.25 PVC) connection required for outbound/inbound message transmission and reception to and from the outside authorities 600a to 600e to automatically re-obtain the outbound/inbound message transmission line following the communication error.

The first active network device 400a is connected between the first master communication application 330a and the first switching device 500a via the active lines L1, and connected with the second backup communication application 350b via the backup lines L7.

The first active network device 400a functions to automatically switch from the active lines L1 connected with the first outside channel combination server 300a to the backup lines L7 connected with the second backup communication application 350b of the second outside channel combination server 300b when a communication error is generated in the first outside channel combination server 300a or when the active lines L1 connected with the first outside channel combination server 300a fail.

The first standby network device 450a is connected between the first master communication application 330a and the first switching device 500a via the backup lines L2, and connected with the second backup communication application 350b via backup lines L8.

The first standby network device 450a is activated when a communication error is generated in the first active network device 400a, or when the active lines L1 connected between the first active network device 400a and the first switching device 500a fail, and remains in a standby state to perform normal outside affairs via the backup lines L2 connected between the first master communication application 330a and the first switching device 500a.

The second active network device 400b is connected between the second master communication application 330b and the second switching device 500b via the active lines L5, and connected with the first backup communication application 350a via the backup lines L3.

The second active network device 400b functions to automatically switch from the active lines L5 connected with the second outside channel combination server 300b to the backup lines L3 connected with the first backup communication application 350a of the first outside channel combination server 300a when a communication error is generated in the second outside channel combination server 300b or when the active lines L5 connected with the second outside channel combination server 300b fail.

The second standby network device 450b is connected between the second master communication application 330b and the second switching device 500b via the backup lines L6, and connected with the first backup communication application 350a via the backup lines L4.

The second standby network device 450b is activated when a communication error is generated in the second active network device 400b, or when the active lines L5 connected between the second active network device 400b and the second switching device 500b fail, and remains in a standby state to perform normal outside affairs via the backup lines L6 connected between the second master communication application 330b and the second switching device 500b.

The first active and standby network devices 400a and 450a and the second active and standby network devices 400b and 450b applied to the exemplary embodiment of the present invention as described above are preferably implemented by, for example, a Mega Box.

The first switching device 500a is connected with the first active and standby network devices 400a and 450a via the active lines L1 and the backup lines L2, and functions to automatically switch to the first standby network device 400b when a communication error is generated in the first active network device 400a or when the active lines L1 connected with the first active network device 400a fail.

The second switching device 500b is connected with the second active and standby network devices 400b and 450b via the active lines L5 and the backup lines L6, and functions to automatically switch to the second standby network device 450b when a communication error is generated in the second active network device 400b or when the active lines L5 connected with the second active network device 400b fail.

Preferably, the first and second switching devices 500a and 500b applied to the exemplary embodiment of the present invention as described above are implemented by, for example, a fallback switch.

The outside authorities 600a to 600e are distributed and connected to the first and second switching devices 500a and 500b using affairs channel lines A to E connected through a private-line protocol (e.g., X.25 or TCP/IP protocol). Here, the outside authority 600c is connected with the first and second switching devices 500a and 500b via dual lines C-1 and C-2.

Hereinafter, operation, dependent on communication errors, of a system for processing communication errors in an outside channel combination environment according to an exemplary embodiment of the present invention will be described in detail.

FIGS. 2 to 11 are flow diagrams illustrating message processing dependent on communication errors in a system for processing communication errors in an outside channel combination environment according to an exemplary embodiment of the present invention.

Referring to FIG. 2, an outbound/inbound message transmission line when the system for processing communication errors in an outside channel combination environment according to an exemplary embodiment of the present invention normally operates is shown. The outbound message refers to a message sent from the interior to the exterior, and the inbound message refers to a message sent from the exterior to the interior.

First, affairs processing associated with an outbound message for the outside authorities 600a to 600e is as follows:

An outbound message for the outside authorities 600a to 600c generated from the internal affairs processing system, i.e., the user terminals 100a to 100n (see FIG. 1) is transmitted to the first message relaying application 310a of the first outside channel combination server 300a via the first outside-affairs processing application 250a of the first outside-affairs server 200a.

Upon receipt of the outbound message, the first message relaying application 310a checks information on a line connection with the outside authorities 600a to 600c and a transmission state. Since the first outside channel combination server 300a is currently connected with the line to the outside authorities 600a to 600c, the first message relaying application 310a routes the outbound message to the first master communication application 330a of the first outside channel combination server 300a.

The first master communication application 330a then transmits the outbound message to the outside authorities 600a to 600c via the active lines L1, the first active network device 400a, the first switching device 500a, and the affairs channel-specific lines A to C-1.

Meanwhile, the outbound message for the outside authorities 600c to 600e generated from the user terminals 100a to 100n is transmitted to the second message relaying application 310b of the second outside channel combination server 300b via the second outside-affairs processing application 250b of the second outside-affairs server 200b.

Upon receipt of the outbound message, the second message relaying application 310b checks information on a line connection with the outside authorities 600c to 600e and a transmission state. Since the second outside channel combination server 300b is currently connected with the line to the outside authorities 600c to 600e, the second message relaying application 310b routes the outbound message to the second master communication application 330b of the second outside channel combination server 300b.

The second master communication application 330b then transmits the outbound message to the outside authorities 600c to 600e via the active lines L5, the second active network device 400b, the second switching device 500b, and the affairs channel-specific lines C-2 to E.

Second, affairs processing associated with an inbound message generated from hosts (not shown) of the outside authorities 600a to 600e is as follows:

When the hosts of the outside authorities 600a to 600c generate the inbound message, the inbound message is transmitted to the first master communication application 330a serving message transmission and reception of the active lines L1 connected with the outside authorities 600a to 600c via the affairs channel-specific lines A to C-1, the first switching device 500a, and the first active network device 400a.

The first master communication application 330a then transmits the inbound message to the user terminals 100a to 100n via the first message relaying application 310a and the first outside-affairs processing application 250a of the first outside-affairs server 200a.

Meanwhile, when the hosts of the outside authorities 600c to 600e generate the inbound message, the inbound message is transmitted to the second master communication application 330b serving message transmission and reception of the active lines L5 connected with the outside authorities 600a to 600c via the affairs channel-specific lines C-2 to E, the second switching device 500b, and the second active network device 400b.

The second master communication application 330b then transmits the inbound message to the user terminals 100a to 100n via the second message relaying application 310b and the second outside-affairs processing application 250b of the second outside-affairs server 200b.

Referring to FIG. 3, the outbound/inbound message transmission line when a communication error is generated in the first outside-affairs server 200a is shown. Outside-affairs processing is the same as in the normal operation of FIG. 2, except that all transmission and reception messages related to the outside affairs, i.e., outbound/inbound affairs processing, which have been processed by the first outside-affairs server 200a, are processed by the second outside-affairs processing application 250b of the second outside-affairs server 200b.

Referring to FIG. 4, the outbound/inbound message transmission line when a communication error is generated in the second outside-affairs server 200b is shown. Outside-affairs processing is the same as in the normal operation of FIG. 2, except that all transmission and reception messages related to the outside affairs, i.e., outbound/inbound affairs processing, which have been processed by the second outside-affairs server 200b, are processed by the first outside-affairs processing application 250a of the first outside-affairs server 200a, and accordingly a detailed description thereof will be omitted.

Referring to FIG. 5, the outbound/inbound message transmission line when a communication error is generated in the first outside channel combination server 300a is shown. First, the first active network device 400a automatically switches from the active lines L1 connected with the first outside channel combination server 300a to the backup lines L7 connected with the second backup communication application 350b of the second outside channel combination server 300b when the communication error is generated in the first outside channel combination server 300a.

The transmission and reception of the outbound/inbound message generated for affairs processing with the outside authorities 600a to 600c is made via the path that excludes the first outside channel combination server 300a.

Meanwhile, the second outside channel combination server 300b detects, in real time, the first active network device 400a automatically switching to the backup lines L7 connected with the second backup communication application 350b and automatically executes the second backup communication application 350b for the first master communication application 330a. The second backup communication application 350b re-establishes a private line (e.g., X.25 PVC) connection required for outbound/inbound message transmission and reception to and from the outside authorities 600a to 600c to automatically re-obtain the outbound/inbound message transmission line following the communication error.

When dual lines C-1 and C-2 are connected and a communication error is generated in the first outside channel combination server 300a, the outbound message generated from the first and second outside-affairs servers 200a and 200b is automatically transmitted via only the line C-2 that does not fail, before the first active network device 400a switches from the active lines L1 connected with the first outside channel combination server 300a to the backup lines L7 connected with the second backup communication application 350b of the second outside channel combination server 300b.

First, affairs processing associated with the outbound message for the outside authorities 600a to 600e is as follows:

The outbound message for the outside authorities 600a to 600c generated from the user terminals 100a to 100n is transmitted to the outside authorities 600a to 600c via the first outside-affairs processing application 250a of the first outside-affairs server 200a, the second message relaying application 310b and the second backup communication application 350b of the second outside channel combination server 300b, the first active network device 400a, the first switching device 500a, and the affairs channel-specific lines A to C-1.

Meanwhile, the outbound message for the outside authorities 600c to 600e generated from the user terminals 100a to 100n is transmitted to the outside authorities 600c to 600e via the second outside-affairs processing application 250b of the second outside-affairs server 200b, the second message relaying application 310b and the second master communication application 330b of the second outside channel combination server 300b, the second active network device 400b, the second switching device 500b, and the affairs channel-specific lines C-2 to E.

Second, affairs processing associated with the inbound message generated from the hosts of the outside authorities 600a to 600e is as follows:

First, when the hosts of the outside authorities 600a to 600c transmit the inbound message, the inbound message is transmitted to the user terminals 100a to 100n via the affairs channel-specific lines A to C-1, the first switching device 500a, the first active network device 400a, the second backup communication application 350b and the second message relaying application 310b of the second outside channel combination server 300b, and the first outside-affairs processing application 250a of the first outside-affairs server 200a.

Meanwhile, when the hosts of the outside authorities 600c to 600e transmit the inbound message, the inbound message is transmitted to the user terminals 100a to 100n via the affairs channel-specific lines C-2 to E, the second switching device 500b, the second active network device 400b, the second master communication application 330b and the second message relaying application 310b of the second outside channel combination server 300b, and the second outside-affairs processing application 250b of the second outside-affairs server 200b.

Referring to FIG. 6, the outbound/inbound message transmission line when a communication error is generated in the second outside channel combination server 300b is shown. The second active network device 400b automatically switches from the active lines L5 connected with the second outside channel combination server 300b to the backup lines L3 connected with the first backup communication application 350a of the first outside channel combination server 300a when the communication error is generated in the second outside channel combination server 300b.

The transmission and reception of the outbound/inbound message generated for affairs processing with the outside authorities 600a to 600c is made via the path that excludes the second outside channel combination server 300b.

Meanwhile, the first outside channel combination server 300b detects, in real time, the second active network device 400b automatically switching to the backup lines L3 connected with the first backup communication application 350a and automatically executes the first backup communication application 350a for the second master communication application 330b. The first backup communication application 350a re-establishes a private line (e.g., X.25 PVC) connection required for outbound/inbound message transmission and reception to and from the outside authorities 600a to 600c to automatically re-obtain the outbound/inbound message transmission line following the communication error.

When dual lines C-1 and C-2 are connected and a communication error is generated in the second outside channel combination server 300b, the outbound message generated from the first and second outside-affairs servers 200a and 200b is automatically transmitted via only the line C-1 that does not fail, before the second active network device 400b switches from the active lines L5 connected with the second outside channel combination server 300b to the backup lines L3 connected with the first backup communication application 350a of the first outside channel combination server 300a.

First, affairs processing associated with the outbound message for the outside authorities 600a to 600e is as follows:

The outbound message for the outside authorities 600a to 600c generated from the user terminals 100a to 100n is transmitted to the outside authorities 600a to 600c via the first outside-affairs processing application 250a of the first outside-affairs server 200a, the first message relaying application 310a and the first master communication application 330a of the first outside channel combination server 300a, the first active network device 400a, the first switching device 500a, and the affairs channel-specific lines A to C-1.

Meanwhile, the outbound message for the outside authorities 600c to 600e generated from the user terminals 100a to 100n is transmitted to the outside authorities 600c to 600e via the second outside-affairs processing application 250b of the second outside-affairs server 200b, the first message relaying application 310a and the first backup communication application 350a of the first outside channel combination server 300a, the second active network device 400b, the second switching device 500b, and the affairs channel-specific lines C-2 to E.

Second, affairs processing associated with the inbound message generated from the hosts of the outside authorities 600a to 600e is as follows:

First, when the hosts of the outside authorities 600a to 600c transmit the inbound message, the inbound message is transmitted to the user terminals 100a to 100n via the affairs channel-specific lines A to C-1, the first switching device 500a, the first active network device 400a, the first master communication application 330a and the first message relaying application 310a of the first outside channel combination server 300a, and the first outside-affairs processing application 250a of the first outside-affairs server 200a.

Meanwhile, when the hosts of the outside authorities 600c to 600e transmit the inbound message, the inbound message is transmitted to the user terminals 100a to 100n via the affairs channel-specific lines C-2 to E, the second switching device 500b, the second active network device 400b, the first backup communication application 350a and the first message relaying application 310a of the first outside channel combination server 300a, and the second outside-affairs processing application 250b of the second outside-affairs server 200b.

Referring to FIG. 7, the outbound/inbound message transmission line when the active lines L1 connected between the first master communication application 330a of the first outside channel combination server 300a and the first active network device 400a fails is shown. Outside-affairs processing is the same as in FIG. 5, except that a session is shared between the first message relaying application 310a of the first outside channel combination server 300a and the second message relaying application 310b of the second outside channel combination server 300b with respect to the outbound/inbound message to and from the outside authorities 600a to 600c, and accordingly, a detailed description thereof will be omitted.

Referring to FIG. 8, the outbound/inbound message transmission line when the active lines L5 connected between the second master communication application 330b of the second outside channel combination server 300b and the second active network device 400b fails is shown. Outside-affairs processing is the same as in FIG. 6, except that a session is shared between the first message relaying application 310a of the first outside channel combination server 300a and the second message relaying application 310b of the second outside channel combination server 300b with respect to the outbound/inbound message to and from the outside authorities 600a to 600c, and accordingly, a detailed description thereof will be omitted.

Referring to FIG. 9, the outbound/inbound message transmission line when a communication error is generated in the first active network device 400a is shown. When the communication error is generated in the first active network device 400a, the first switching device 500a automatically switches from the active lines L1 (see FIG. 2) connected with the first active network device 400a to the backup lines L2 connected with the first standby network device 450a.

The transmission and reception of the outbound/inbound message generated for affairs processing with the outside authorities 600a to 600c is made via the path that excludes the first active network device 400a.

Meanwhile, when the first master communication application 330a of the first outside channel combination server 300a changes a configuration in connection with the switching task performed by the first switching device 500a, the first master communication application 330a automatically reflects the change and re-establishes a private line (e.g., X.25 PVC) connection required for outbound/inbound message transmission and reception to and from the outside authorities 600a to 600c to automatically re-obtain the outbound/inbound message transmission line following the communication error.

When the dual lines C-1 and C-2 are connected, the outbound message generated from the first and second outside-affairs servers 200a and 200b is normally transmitted to the outside authority 600c via the second outside channel combination server 300b, the second active network device 400b, the second switching device 500b, and the line C-2. If a communication error is generated in the first active network device 400a and switching to the first standby network device 450a is not yet completed, the message is automatically transmitted via only the line C-2 that does not fail.

Outside-affairs processing is the same as in the normal operation of FIG. 2, except that the outbound/inbound message to and from the outside authorities 600a to 600c is transferred via the first master communication application 330a of the first outside channel combination server 300a connected with the backup lines L2, the first standby network device 450a, and the first switching device 500a, and accordingly a detailed description thereof will be omitted.

Although not shown in FIG. 9, the same is applied to the case where the active lines L1 connected between the first active network device 400a and the first switching device 500a fail.

Referring to FIG. 10, the outbound/inbound message transmission line when a communication error is generated in the second active network device 400b is shown. When a communication error is generated in the second active network device 400b, the second switching device 500b automatically switches from the active lines L5 (see FIG. 2) connected with the second active network device 400b to the backup lines L6 connected with the second standby network device 450b.

The transmission and reception of the outbound/inbound message generated for affairs processing with the outside authorities 600a to 600c is made via the path that excludes the second active network device 400b.

Meanwhile, when the second master communication application 330b of the second outside channel combination server 300b changes a configuration in connection with the switching task performed by the second switching device 500b, the second master communication application 330b automatically reflects the change and re-establishes the private line (e.g., X.25 PVC) connection required for outbound/inbound message transmission and reception to and from the outside authorities 600a to 600c to automatically re-obtain the outbound/inbound message transmission line following the communication error.

When the dual lines C-1 and C-2 are connected, the outbound message generated from the first and second outside-affairs servers 200a and 200b is normally transmitted to the outside authority 600c via the first outside channel combination server 300a, the first active network device 400a, the first switching device 500a, and the line C-1. If a communication error is generated in the second active network device 400b and switching to the second standby network device 450b is not yet completed, the message is automatically transmitted via only the line C-1 that does not fail.

Outside-affairs processing is the same as in the normal operation of FIG. 2, except that the outbound/inbound message to and from the outside authorities 600a to 600c is transferred via the second master communication application 330b of the second outside channel combination server 300b connected with the backup lines L6, the second standby network device 450b, and the second switching device 500b, and accordingly a detailed description thereof will be omitted.

Although not shown in FIG. 10, the same is applied to the case where the active lines L5 connected between the second active network device 400b and the second switching device 500b fail.

Referring to FIG. 11, the outbound/inbound message transmission line when a communication error is generated in the first or second switching device 500a or 500b is shown. When an additional communication error is not generated in the first or second active network device 400a or 400b, which is connected with the first or second switching device 500a or 500b where the communication error is generated, there is no effect on affairs processing associated with the outside authorities 600a to 600e and accordingly there is no changing task.

The first or second switching device 500a or 500b includes a sealed latching relay, which maintains a last communication path even when an error is generated, e.g., even when power is not supplied to the switch device.

However, when a fatal defect is generated in the first or second switching device 500a or 500b and equipment must be replaced to perform affairs processing, outside authority affairs performed through the first or second switching device 500a or 500b stop. In this case, the outside channel combination system or outside authority performs store and forward (SAF) processing, non-transmitted message reprocessing and the like to minimize affairs processing failure caused by the defect.

As previously described, when the communication error is generated in the first or the second switching device 500a or 500b, the changing task is not separately performed and the operation is the same as the normal operation of FIG. 2. Accordingly, a detailed description thereof will be omitted.

Meanwhile, the method for processing communication errors in the outside channel combination environment according to an exemplary embodiment of the present invention can be implemented as a computer-readable code in a computer-readable recording medium. The computer-readable recording medium may be any recording device for storing computer-readable data.

Examples of the computer-readable recording medium include a read only memory (ROM), a random access memory (RAM), a CD-ROM, a magnetic tape, a hard disk, a floppy disk, a mobile storage device, a non-volatile memory (e.g., a Flash Memory), an optical data storage device, and a carrier wave (e.g., transmission via the Internet).

The computer-readable recording medium may be distributed to computer systems interconnected via a computer communication network, and the method may be stored and executed as a code in the recording medium.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A system for processing communication errors in an outside channel combination environment, comprising: first and second outside-affairs servers connected with a plurality of user terminals and having respective first and second outside-affairs processing applications having the same function to perform banking transaction affairs associated with a plurality of outside authorities connected by a private line, the banking transaction affairs including bank deposits, bank payments, credit card transactions, insurance transactions, and/or financial securities transactions; first and second outside channel combination servers for processing outside affairs associated with the outside authorities, the first and second outside channel combination servers having respective message relaying and communication applications to interwork with the first and second outside-affairs servers; first and second active and standby network devices respectively connected in parallel with the first and second outside channel combination servers, the first and second active network devices performing normal outside affairs, and the first and second standby network devices being activated when a communication error is generated to perform the normal outside affairs; and first and second switching devices respectively provided between the first and second active and standby network devices and the outside authorities to selectively connect the first and second active and standby network devices when the communication error is generated.

2. The system according to claim 1, wherein when an outbound message is transmitted to the message relaying applications of the first and second outside channel combination servers via the outside-affairs processing applications of the first and second outside-affairs servers, loads are balanced in a ratio of 50:50.

3. The system according to claim 1, wherein when an inbound message is transmitted to the outside-affairs processing applications of the first and second outside channel combination servers via the message relaying applications of the first and second outside-affairs servers, loads are balanced in a ratio of 50:50.

4. The system according to claim 1, wherein the message relaying applications of the first and second outside channel combination servers share information related to message processing via a session, and function to manage line connection information required for message transmission and a transmission state.

5. The system according to claim 1, wherein the communication application of the first outside channel combination server comprises: a first master communication application connected with the first active and standby network devices via active and backup lines to transmit and receive messages between the first outside-affairs server and the first active or standby network device according to whether or not a communication error is generated in the first active and standby network devices; and a first backup communication application connected with the second active and standby network devices via backup lines to transmit and receive messages between the second outside-affairs server and the second active or standby network device according to whether or not a communication error is generated in the second active and standby network devices when a communication error is generated in the second outside channel combination server, and the communication application of the second outside channel combination server comprises: a second master communication application connected with the second active and standby network devices via the active and backup lines to transmit and receive the messages between the second outside-affairs server and the second active or standby network device according to whether or not the communication error is generated in the second active and standby network device; and a second backup communication application connected with the first active and standby network devices via the backup lines to transmit and receive the messages between the first outside-affairs server and the first active or standby network device according to whether or not the communication error is generated in the first active and standby network devices when the communication error is generated in the first outside channel combination server.

6. The system according to claim 5, wherein, when the communication error is generated in the first outside channel combination server, the first active network device automatically switches from the active lines connected with the first outside channel combination server to the backup lines connected with the second backup communication application of the second outside channel combination server, and allows messages between the first outside-affairs server and the outside authorities to be transferred via a path composed of the second backup communication application, the first active network device, and the first switching device, and when the communication error is generated in the second outside channel combination server, the second active network device automatically switches from the active lines connected with the second outside channel combination server to the backup lines connected with the first backup communication application of the first outside channel combination server, and allows messages between the second outside-affairs server and the outside authorities to be transferred via a path composed of the first backup communication application, the second active network device, and the second switching device.

7. The system according to claim 5, wherein when the active lines connected between the first outside channel combination server and the first active network device fail, the first active network device automatically switches from the active lines connected with the first outside channel combination server to the backup lines connected with the second backup communication application of the second outside channel combination server, and allows messages between the first outside-affairs server and the outside authorities to be transferred via a path composed of the message relaying applications of the first and second outside channel combination servers, the second backup communication application, the first active network device, and the first switching device, and when the active lines connected between the second outside channel combination server and the second active network device fail, the second active network device automatically switches from the active lines connected with the second outside channel combination server to the backup lines connected with the first backup communication application of the first outside channel combination server, and allows messages between the second outside-affairs server and the outside authorities to be transferred via a path composed of the message relaying applications of the second and first outside channel combination servers, the first backup communication application, the second active network device, and the second switching device.

8. The system according to claim 1, wherein the first switching device is connected with the first active and standby network devices via the active and backup lines and automatically switches to the first standby network device when the communication error is generated in the first active network device, and the second switching device is connected with the second active and standby network devices via the active and backup lines and automatically switches to the second standby network device when the communication error is generated in the second active network device.

9. The system according to claim 1, wherein in normal operation of the system, the messages are transferred to and from the outside authorities via the path composed of the first outside-affairs server, the first outside channel combination server, the first active network device, and the first switching device, and the messages are transferred to and from the outside authorities via the path composed of the second outside-affairs server, the second outside channel combination server, the second active network device, and the second switching device.

10. The system according to claim 1, wherein when the communication error is generated in the first outside-affairs server, the second outside-affairs server processes all outside affairs including outside affairs that have been processed by the first outside-affairs server, and allows the messages to be transferred to and from the outside authorities via the path composed of the second outside-affairs server, the first outside channel combination server, the first active network device, and the first switching device, and when the communication error is generated in the second outside-affairs server, the first outside-affairs server processes all outside affairs including outside affairs that have been processed by the second outside-affairs server, and allows the messages to be transferred to and from the outside authorities via the path composed of the first outside-affairs server, the second outside channel combination server, the second active network device, and the second switching device.

11. The system according to claim 1, wherein when the communication error is generated in the first active network device, or when the active lines connected between the first active network device and the first switching device fail, the messages are transferred to and from the outside authorities via the path composed of the first outside-affairs server, the first outside channel combination server, the first standby network device, and the first switching device, and when the communication error is generated in the second active network device, or when the active lines connected between the second active network device and the second switching device fail, the messages are transferred to and from the outside authorities via the path composed of the second outside-affairs server, the second outside channel combination server, the second standby network device, and the second switching device.

12. A method for processing communication errors in an outside channel combination system environment comprising first and second outside-affairs servers having first and second out-side affairs processing applications having the same function to perform banking transaction affairs, first and second outside channel combination servers, first and second active and standby network devices, and first and second switching devices, the method comprising the steps of: (a) in normal operation of the system, transferring messages to and from a plurality of outside authorities connected by a private line, the messages for processing banking transaction affairs including bank deposits, bank payments, credit card transactions, insurance transactions, and/or financial securities transactions via a path composed of the first outside-affairs server, the first outside channel combination server, the first active network device, and the first switching device; (b) in normal operation of the system, transferring messages to and from the outside authorities connected by a private line, the messages for processing banking transaction affairs including bank deposits, bank payments, credit card transactions, insurance transactions, and/or financial securities transactions via a path composed of the second outside-affairs server, the second outside channel combination server, the second active network device, and the second switching device; (c) when a communication error is generated in the first outside-affairs server, processing, by the second outside-affairs server, all outside affairs including outside affairs that have been processed by the first outside-affairs server, and transferring the messages to and from the outside authorities connected by a private line, the messages for processing banking transaction affairs including bank deposits, bank payments, credit card transactions, insurance transactions, and/or financial securities transactions via the path composed of the second outside-affairs server, the first outside channel combination server, the first active network device, and the first switching device; and (d) when a communication error is generated in the second outside-affairs server, processing, by the first outside-affairs server, all outside affairs including outside affairs that have been processed by the second outside-affairs server, and transferring the messages to and from the outside authorities connected by a private line, the messages for processing banking transaction affairs including bank deposits, bank payments, credit card transactions, insurance transactions, and/or financial securities transactions via the path composed of the first outside-affairs server, the second outside channel combination server, the second active network device, and the second switching device.

13. The method according to claim 12, further comprising the steps of: (e) when a communication error is generated in the first active network device, or when active lines connected between the first active network device and the first switching device fail, transferring the messages to and from the outside authorities via the path composed of the first outside-affairs server, the first outside channel combination server, the first standby network device, and the first switching device; and (f) when a communication error is generated in the second active network device, or when active lines connected between the second active network device and the second switching device fail, transferring the messages to and from the outside authorities via the path composed of the second outside-affairs server, the second outside channel combination server, the second standby network device, and the second switching device.

14. The method according to claim 12, further comprising the steps of: (g) when the communication error is generated in the first outside channel combination server, automatically switching, by the first active network device, from the active lines connected with the first outside channel combination server to backup lines connected with the second backup communication application of the second outside channel combination server, and transferring messages between the first outside-affairs server and the outside authorities via the path composed of the second outside channel combination server, the first active network device, and the first switching device; and (h) when the communication error is generated in the second outside channel combination server, automatically switching, by the second active network device, from the active lines connected with the second outside channel combination server to the backup lines connected with the first backup communication application of the first outside channel combination server, and transferring messages between the second outside-affairs server and the outside authorities via the path composed of the first outside channel combination server, the second active network device, and the second switching device.

15. The method according to claim 12, further comprising the steps of: (i) when the active lines connected between the first outside channel combination server and the first active network device fail, automatically switching, by the first active network device, from the active lines connected with the first outside channel combination server to the backup lines connected with the second backup communication application of the second outside channel combination server, and transferring messages between the first outside-affairs server and the outside authorities via a path composed of message relaying applications of the first and second outside channel combination servers, a backup communication application of the second outside channel combination server, the first active network device, and the first switching device; and (j) when the active lines connected between the second outside channel combination server and the second active network device fail, automatically switching, by the second active network device, from the active lines connected with the second outside channel combination server to the backup lines connected with the first backup communication application of the first outside channel combination server, and transferring messages between the second outside-affairs server and the outside authorities via a path composed of message relaying applications of the first and second outside channel combination servers, a backup communication application of the first outside channel combination server, the second active network device, and the second switching device.

16. A computer-readable recording medium having a program recorded thereon for implementing a method according to any one of claims 12 to 15.

* * * * *